United States Patent
Kosuge

(10) Patent No.: US 11,904,674 B2
(45) Date of Patent: Feb. 20, 2024

(54) BATTERY PACK SUPPORT STRUCTURE

(71) Applicant: Toyota Jidosha Kabushiki Kaisha, Toyota (JP)

(72) Inventor: Tomotake Kosuge, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 68 days.

(21) Appl. No.: 17/319,467

(22) Filed: May 13, 2021

(65) Prior Publication Data
US 2021/0260979 A1    Aug. 26, 2021

Related U.S. Application Data

(63) Continuation of application No. 16/558,881, filed on Sep. 3, 2019, now Pat. No. 11,034,229.

(30) Foreign Application Priority Data

Sep. 5, 2018  (JP) .................................. 2018-165596

(51) Int. Cl.
*B60K 1/04* (2019.01)
*B60L 50/64* (2019.01)
*H01M 50/249* (2021.01)

(52) U.S. Cl.
CPC ............... *B60K 1/04* (2013.01); *B60L 50/64* (2019.02); *H01M 50/249* (2021.01); *B60K 2001/0438* (2013.01); *H01M 2220/20* (2013.01)

(58) Field of Classification Search
CPC ... B60K 1/04; B60K 2001/0438; B60L 50/64; B60L 50/66; H01M 50/20; H01M 2220/20; H01M 50/249
See application file for complete search history.

(56) References Cited

U.S. PATENT DOCUMENTS

| | | | |
|---|---|---|---|
| 7,503,585 B2 | 3/2009 | Hashimura et al. | |
| 8,276,698 B2 | 10/2012 | Guss et al. | |
| 8,839,895 B2 | 9/2014 | Kato et al. | |
| 11,034,229 B2 * | 6/2021 | Kosuge ................ | H01M 50/20 |
| 2013/0264135 A1 | 10/2013 | Meyers et al. | |
| 2015/0255764 A1 * | 9/2015 | Loo ....................... | H01M 50/20 |
| | | | 429/149 |
| 2016/0075223 A1 | 3/2016 | Lee et al. | |
| 2017/0338454 A1 | 11/2017 | Millon | |
| 2018/0086192 A1 | 3/2018 | Ishihara et al. | |

FOREIGN PATENT DOCUMENTS

| | | | |
|---|---|---|---|
| JP | 2015-170452 A | 9/2015 | |
| JP | 2018-052209 A | 4/2018 | |

OTHER PUBLICATIONS

U.S. Appl. No. 16/558,881, filed Sep. 3, 2019, Tomotake Kosuge.

* cited by examiner

*Primary Examiner* — Jason D Shanske
*Assistant Examiner* — James J Triggs
(74) *Attorney, Agent, or Firm* — Dinsmore & Shohl LLP

(57) ABSTRACT

A battery pack is placed on a battery frame. The battery frame has a lateral frame which extends in a lateral direction. A connection bracket for connecting the battery frame and a floor of a vehicle is joined to an end of the lateral frame. With the joining of the end of the lateral frame with the connection bracket, a crank shape is formed in the lateral direction. A reinforcement plate functioning as a brace is placed at a corner portion of the crank shape.

8 Claims, 4 Drawing Sheets

BATTERY PACK SUPPORT STRUCTURE

CROSS REFERENCE TO RELATED APPLICATION

This application is a continuation application of U.S. patent application Ser. No. 16/558,881 filed Sep. 3, 2019, which claims priority to Japanese Patent Application No. 2018-165596 filed on Sep. 5, 2018, which is incorporated herein by reference in its entirety including the specification, claims, drawings, and abstract.

TECHNICAL FIELD

The present disclosure relates to a battery pack support structure which supports a battery pack mounted below a floor of a vehicle.

BACKGROUND

There are known vehicles which have, below a floor of the vehicle, a battery for supplying electric power for driving the vehicle. JP 2018-52209 A discloses a vehicle understructure (10) in which a battery (18) is placed in a recess (32) formed on a floor panel (31). The reference numerals in parentheses are reference numerals used in JP 2018-52209 A, and are not related to the reference numerals used in the description of the embodiment of the present disclosure.

In some cases, a part of the support structure for mounting the battery pack below the floor is positioned at a side of the battery pack. During a side collision, this part of the support structure moves toward the battery pack.

An advantage of the present disclosure lies in suppression of movement, during side collision, of a part of a support structure positioned at a side of the battery pack.

SUMMARY

According to one aspect of the present disclosure, there is provided a support structure of a battery pack, comprising: a battery frame that is placed along a lower surface or an upper surface of a battery pack mounted below a floor of a vehicle and that is joined to the battery pack, and a connection bracket that connects the battery frame and the floor of the vehicle. The battery frame has a plurality of lateral beams which extend in a lateral direction, and the connection bracket is joined to an end of at least a part of the lateral beams. The lateral beam and the connection bracket connected to the lateral beam together form a crank shape in the lateral direction. A bracing member is placed at a corner portion of the crank shape.

During the side collision, deformation of the connection bracket positioned at the side of the battery pack and deformation of structures around the connection bracket are suppressed by the bracing member, and movement of this portion toward the battery pack can be suppressed.

According to another aspect of the present disclosure, the support structure of the battery pack may include a reinforcement plate which extends across ends of the plurality of lateral beams and in a longitudinal direction, and a portion of the reinforcement plate corresponding to the connection bracket functions as the bracing member. With the use of an integral reinforcement plate, in comparison to a configuration in which the bracing member is provided for each connection bracket, the structure can be simplified.

According to another aspect of the present disclosure, the connection bracket may include a lateral beam joined part which is joined to the lateral beam, a floor joined part which is connected to the floor, and a connection part which connects the lateral beam joined part and the floor joined part. At least a part of the bracing member may be joined to the lateral beam and an end, of the connection part of the connection bracket, at a side of the floor joined part. With this structure, during the side collision, movement of the floor joined part of the connection bracket can be suppressed.

According to another aspect of the present disclosure, the lateral beam may include a ridgeline which extends along a longitudinal direction of the lateral beam, and the bracing member may include a ridge which extends in a direction connecting the connection bracket and the lateral beam and which is placed aligned to a position of the ridgeline of the lateral beam. By the alignment of the ridgeline of the lateral beam and the ridge of the bracing member, a collision load which is input to the floor joined part of the connection bracket during the side collision can be efficiently transferred to the lateral beam.

According to the present disclosure, during the side collision, movement of a part of the support structure of the battery pack, in particular, of a portion positioned at the side of the battery pack, can be suppressed.

BRIEF DESCRIPTION OF DRAWINGS

Embodiment(s) of the present disclosure will be described by reference to the following figures, wherein.

DESCRIPTION OF EMBODIMENTS

Figure 1:
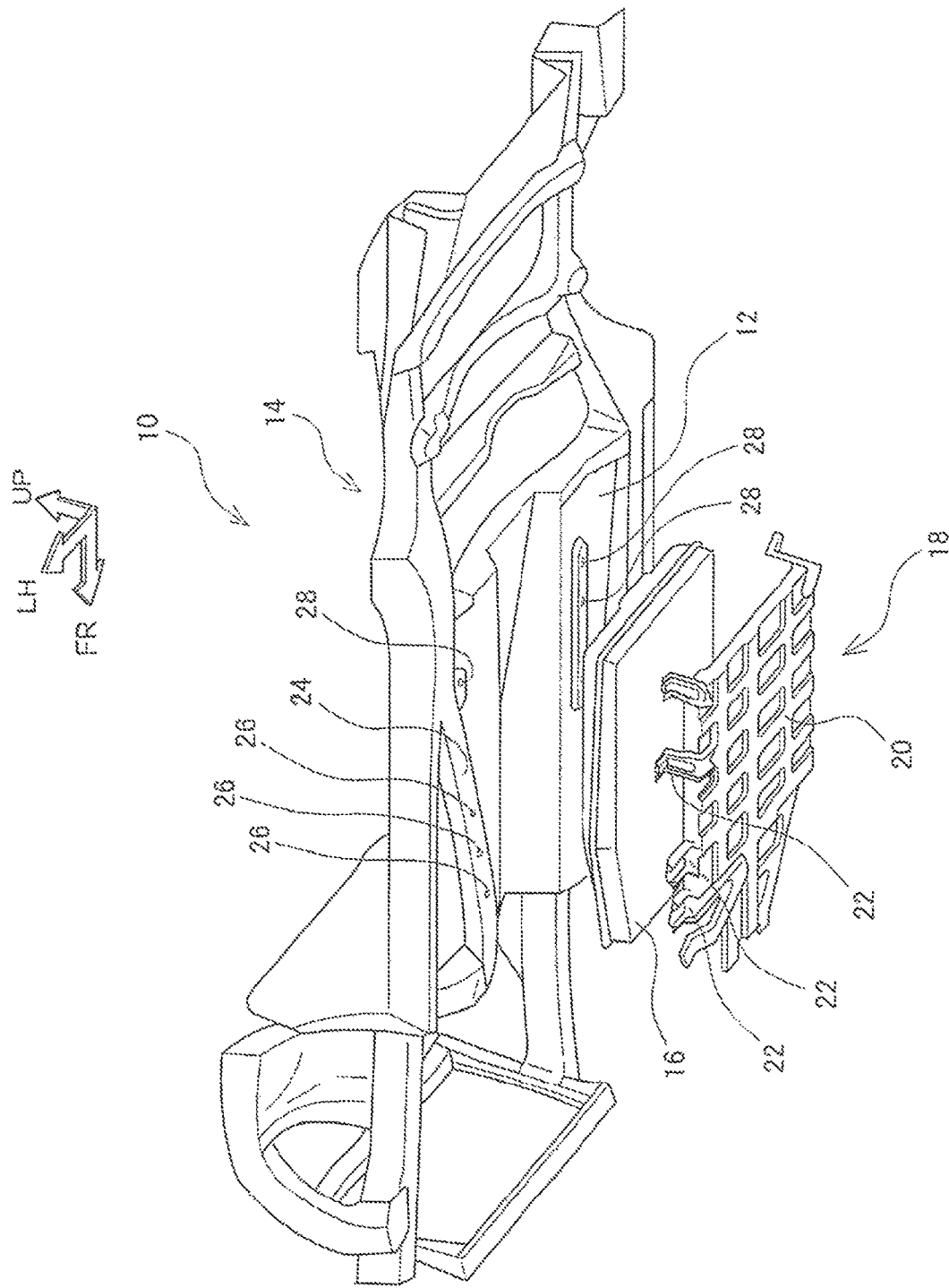
FIG. 1 is a perspective diagram showing an understructure of a vehicle, viewed from below and in an upward direction.

An embodiment of the present disclosure will now be described with reference to the drawings. In the following description, unless otherwise specified, terms indicating a relative position and direction such as front, forward, rear, rearward, left, leftward, right, rightward, up, upward, down, downward, etc., indicate positions and directions in relation to the vehicle. In addition, a front-and-rear direction of the vehicle will also be referred to as a longitudinal direction, a left-and-right direction of the vehicle will also be referred to as a lateral direction, and an up-and-down direction of the vehicle will also be referred to as a vertical direction. In the drawings, a direction of an arrow FR shows a front side, a direction of an arrow UP shows an upper side, and a direction of an arrow LH shows a left side.

FIG. 1 is a perspective diagram of an understructure 10 of a vehicle, viewed from below and in an upward direction. The understructure 10 of the vehicle comprises an underbody 14 having a floor 12, a battery pack 16 mounted below the floor 12, and a battery pack support structure 18 which is joined to a lower surface of the floor 12 and supports the battery pack 16. In FIG. 1, the underbody 14, the battery pack 16, and the battery pack support structure 18 are shown in a state where the elements are separated from each other. The battery pack 16 stores electric power to be supplied to a motor for driving the vehicle. The battery pack support structure 18 includes a lattice-shaped battery frame 20 on an upper surface of which the battery pack 16 is mounted, and a plurality of connection brackets 22 connecting the battery frame 20 and the floor 12. Each of the connection brackets 22 is joined to a joining point 26 provided on an under-reinforcement 24 which extends along the lower surface of the floor 12, or to a joining point 28 provided on the floor 12.

Figure 2:
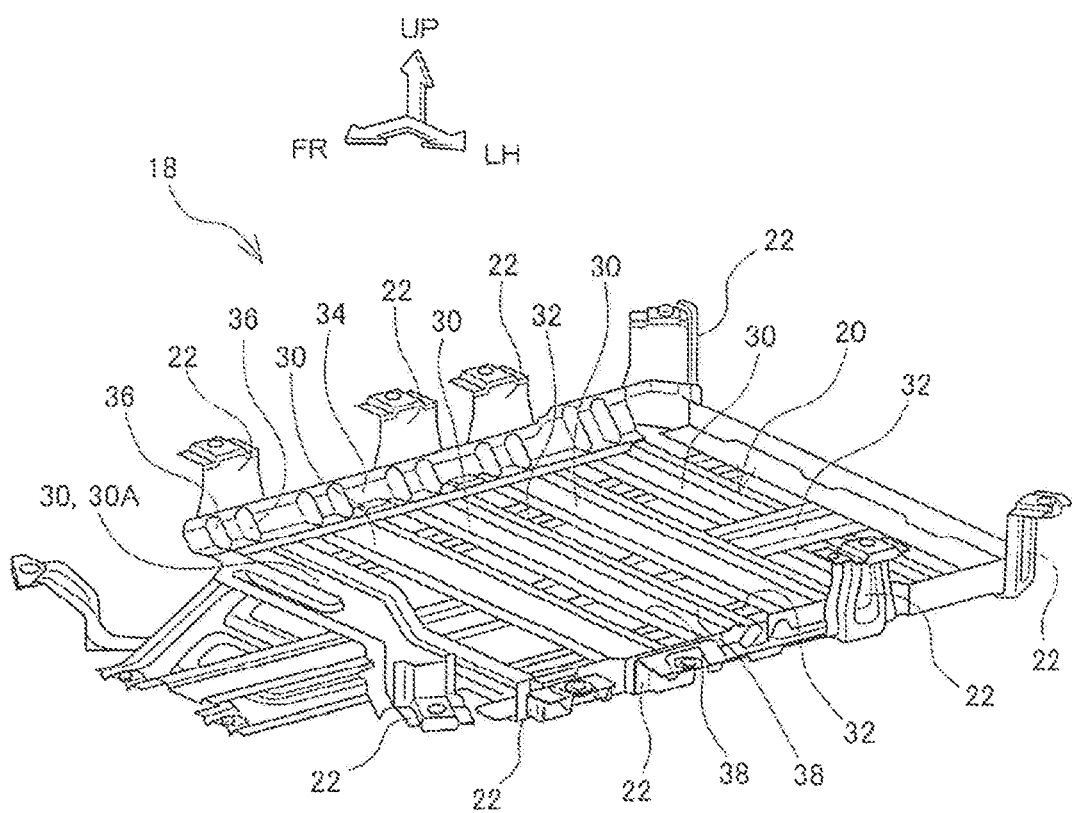
FIG. 2 is a perspective diagram showing an upper surface of a support structure of a battery pack.
Figure 3:
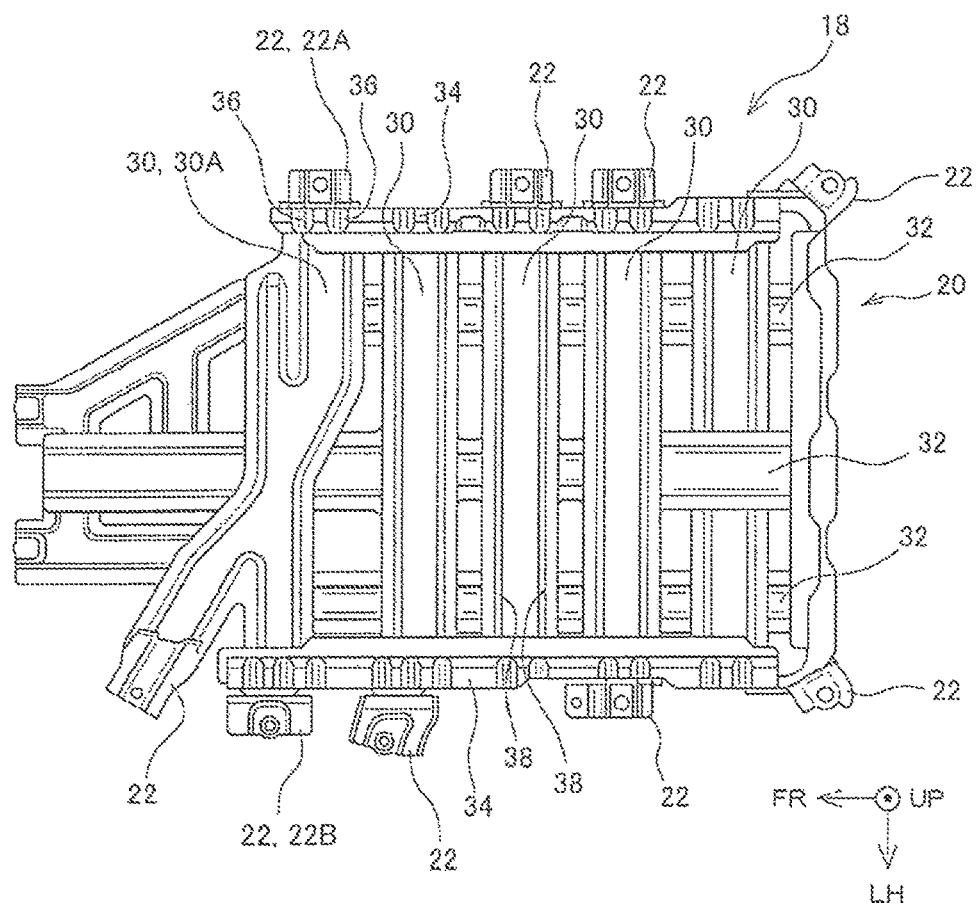
FIG. 3 is a plan view showing a support structure of a battery pack.

FIGS. 2 and 3 are diagrams schematically showing a structure of the battery pack support structure 18. FIG. 2 is a perspective diagram showing an upper surface side, and FIG. 3 is a plan view. The battery frame 20 has a plurality of lateral beams 30 which extend in the lateral direction and a plurality of longitudinal beams 32 which extend in the longitudinal direction. The lateral beams 30 and the longitudinal beams 32 cross each other, to form a lattice shape. Some of the connection brackets 22 are joined to an end of the lateral beam 30.

Each of the connection brackets 22 has a crank shape. Of three sides of the crank shape, one side at one end extends in the lateral direction along with the lateral beam 30, and is joined to the lateral beam 30. One side of the other end is placed parallel to the floor 12, and is joined to the floor 12. The remaining one side extends in the vertical direction and connects the other two sides. By the connection bracket 22 being joined to the lateral beam 30, a portion of the crank shape is formed in the lateral direction at an end of the lateral beam 30.

Reinforcement plates 34 which extend in the longitudinal direction are placed along left and right side edges of the battery frame 20. Each of the reinforcement plates 34 extends across ends of the plurality of lateral beams 30, and the plurality of connection brackets 22, and bridges these constituting elements. In addition, each of the reinforcement plates 34 is placed at a corner portion formed by the lateral beam 30 and the connection bracket 22 which are joined, and functions as a bracing member.

On the reinforcement plate 34, a ridge 36 is formed at least at a position corresponding to the connection bracket 22. The ridge 36 extends in a direction of extension of the brace; that is, a direction to connect the connection bracket 22 and the lateral beam 30 joined thereto. In the battery pack support structure 18, the ridge 36 is provided also at a position where the connection bracket 22 is not provided, which contributes to improvement of rigidity and strength of the reinforcement plate 34 itself.

Each lateral beam 30 has a shape of a lateral cross section of a hat shape, with a side of a recess of the hat shape being directed upward. With a corner portion of the hat shape, a ridgeline 38 which extends in a direction of extension of the lateral beam; that is, the lateral direction, is formed. A position of the ridgeline 38 of the lateral beam 30 and a position of the ridge 36 of the connection bracket 22 are aligned.

Figure 4:
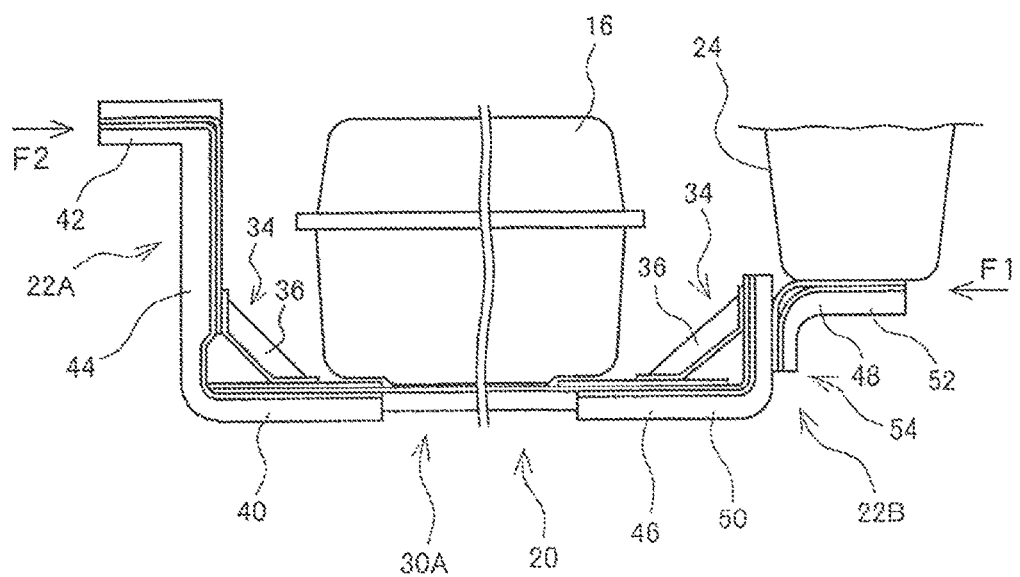
FIG. 4 is a front view of one lateral beam of a battery frame and a connection bracket joined thereto.

FIG. 4 is a diagram showing the lateral beam 30 and the connection bracket 22, and in particular exemplifies a lateral beam 30A which is positioned at a frontmost position, and connection brackets 22A and 22B joined to the lateral beam 30A. FIG. 4 further schematically shows the battery pack 16 and the under-reinforcement 24. The connection bracket 22A is a bracket joined to the joining point 28 on the floor 12, and the connection bracket 22B is a bracket joined to the joining point 26 formed on the under-reinforcement 24. The connection bracket 22B is shorter than the connection bracket 22A by a length corresponding to a height of the under-reinforcement 24. In the following description, the connection bracket 22A will be referred to as a long connection bracket 22A and the connection bracket 22B will be referred to as a short connection bracket 22B.

The long connection bracket 22A has a crank shape. Of three sides of the crank shape, one side at one end extends in the lateral direction along with the lateral beam 30A, and is joined to the lateral beam 30A. This portion will be referred to as a lateral beam joined part 40. One side at the other end is placed in parallel to the floor 12, and is joined to the floor 12. This portion will be referred to as a floor joined part 42. The remaining one side extends in the vertical direction and connects the two other sides. This portion will be referred to as a connection part 44. The reinforcement plate 34 is placed at a corner portion formed by the lateral beam joined part 40 and the connection part 44, and connects these parts. In addition, the ridge 36 on the reinforcement plate 34 extends from the lateral beam 30A to the connection part 44 of the connection bracket 22A.

The short connection bracket 22B is formed in a crank shape by connecting two L-shaped components 46 and 48. Of the two components 46 and 48, a component joined to the lateral beam 30A will be described as a first component 46, and the other component will be described as a second component 48. The short connection bracket 22B formed by the first and second components 46 and 48 has a crank shape. One side at one end, of three sides of the crank shape, extends in the lateral direction along with the lateral beam 30A and is joined to the lateral beam 30A. This portion will be referred to as a lateral beam joined part 50. One side at the other end is placed in parallel to the floor 12, and is joined to the under-reinforcement 24 provided on the floor 12. This portion will be referred to as a floor joined part 52. The remaining one side extends in the vertical direction and connects the two other sides. This portion will be referred to as a connection part 54. At the connection part 54, the first and second components 46 and 48 are joined, for example, using a fastening element such as a bolt.

The reinforcement plate 34 is placed at a corner portion formed by the lateral beam joined part 50 and the connection part 54, and connects these parts. In particular, the reinforcement plate 34 and the connection bracket 22B are joined to each other at an end, of the connection part 54, on a side of the floor joined part 52. In addition, the ridge 36 on the reinforcement plate 34 extends from the lateral beam 30A to the connection part 54 of the connection bracket 22B. The floor joined part 52 of the connection bracket 22B is formed with a thickness in the vertical direction by a method such as curving or bending a plate member. On the other hand, in the reinforcement plate 34 also, with the provision of the ridge 36, a thickness is formed in the vertical direction. The thickness of the floor joined part 52 and the thickness of the reinforcement plate 34 are placed such that at least parts thereof are overlapped in the vertical direction.

During a side collision from a left side, a collision load F1 is input via the under-reinforcement 24 or directly to the short connection bracket 22B. The collision load F1 is transferred through the connection bracket 22B and the reinforcement plate 34 to the lateral beam 30A. The reinforcement plate 34 functions as a brace, and deformation of the first component 46 of the short connection bracket 22B is suppressed. In addition, the collision load transferring in the reinforcement plate 34 acts to bend the lateral beam 30A. An energy of collision is consumed by bending of the lateral beam 30A. With these actions, the deformation of the short connection bracket 22B, in particular, movement of the floor joined part 52, can be suppressed, and a distance to the battery pack 16 can be secured after deformation due to the collision.

During a side collision from a right side, a collision load F2 is input to the long connection bracket 22A. With respect to this collision load, the reinforcement plate 34 functions as a brace, and suppresses falling of the connection bracket 22A toward the side of the battery pack 16. In addition, the collision load transferring in the reinforcement plate 34 acts to bend the lateral beam 30A. The collision energy is consumed by the bending of the lateral beam 30A. With these actions, the deformation and movement of the long connection bracket 22A can be suppressed, and a distance from the battery pack 16 can be secured after the deformation due to the collision.

The reinforcement plate 34 may be additionally or alternatively provided at another corner portion of the connection bracket 22; that is, corner portions formed by the floor joined parts 42 and 52 and the connection parts 44 and 54.

Figure 5:
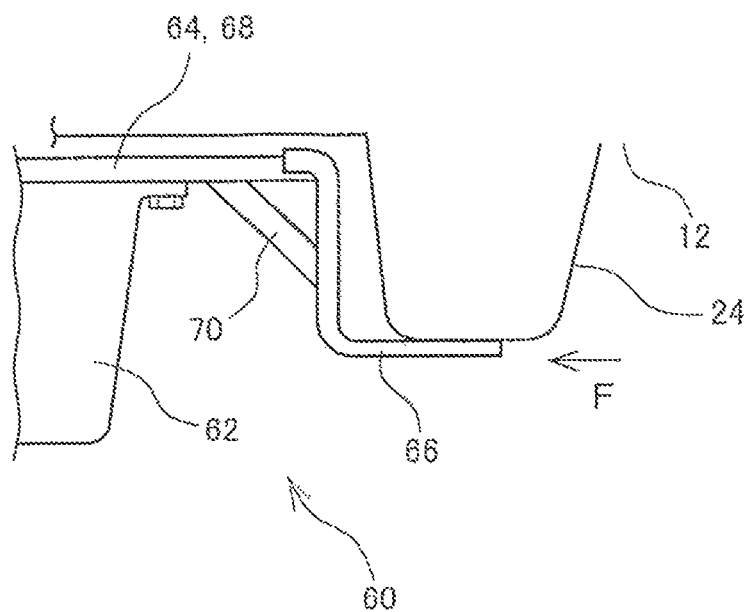
FIG. 5 is a diagram showing another form of a support structure of a battery pack.

FIG. 5 is a diagram showing another embodiment of the support structure of the battery pack. A battery pack support structure 60 includes a battery frame 64 which is placed along an upper surface of the battery pack 62, and a connection bracket 66 which connects the battery frame 64 and the floor 12 of the vehicle. The connection bracket 66 shown in FIG. 5 is joined to the under-reinforcement 24 provided on the floor 12. The battery pack 62 is hung and supported from the battery frame 64 placed along the floor 12.

Similar to the battery frame 20 described above, the battery frame 64 has a lattice shape in which lateral beams 68 and longitudinal beams (not shown) are placed in a crossing manner. The connection bracket 66 is joined to an end of the lateral beam 68, and forms a crank shape at an end of the lateral beam 68, along with the lateral beam 68. A reinforcement plate 70 serving as a bracing member is placed at a corner portion of this crank shape. Similar to the reinforcement plate 34 described above, the reinforcement plate 70 extends in the longitudinal direction, crossing the ends of a plurality of the lateral beams 68.

In the battery pack support structure 60 also, a collision load F applied during the side collision can be transferred through the reinforcement plate 70 to the lateral beam 68, and thus, movement of the connection bracket 66 toward the battery pack 62 can be suppressed.

REFERENCE SIGNS LIST

10 UNDERSTRUCTURE; 12 FLOOR; 14 UNDERBODY; 16 BATTERY PACK; 18 BATTERY PACK SUPPORT STRUCTURE; 20 BATTERY FRAME; 22 CONNECTION BRACKET; 24 UNDER-REINFORCEMENT; 26, 28 JOINING POINT; 30 LATERAL BEAM; 32 LONGITUDINAL BEAM; 34 REINFORCEMENT PLATE (BRACING MEMBER); 36 RIDGE; 38 RIDGELINE (OF LATERAL BEAM); 40 LATERAL BEAM JOINED PART; 42 FLOOR JOINED PART; 44 CONNECTION PART; 46 FIRST COMPONENT; 48 SECOND COMPONENT; 50 LATERAL BEAM JOINED PART; 52 FLOOR JOINED PART; 54 CONNECTION PART; 60 BATTERY PACK SUPPORT STRUCTURE; 62 BATTERY PACK; 64 BATTERY FRAME; 66 CONNECTION BRACKET; 68 LATERAL BEAM; 70 REINFORCEMENT MEMBER (BRACING MEMBER).

The invention claimed is:
1. A battery pack support structure, comprising:
a battery frame that is placed along a lower surface or an upper surface of a battery pack mounted below a floor of a vehicle, that is joined to the battery pack, and that has a plurality of lateral beams extending in a lateral direction;
a connection bracket that is joined to an end of at least a part of one of the plurality of lateral beams, that forms a crank shape in the lateral direction along with the one of the plurality of lateral beams, and that connects the battery frame and the floor, the connection bracket has a lateral beam joined part which is joined to the part of the one of the plurality of lateral beams and a connection part; and
a linear bracing member that is placed at a corner portion of the crank shape, the linear bracing member extending linearly between the connection part and the part of the one of the plurality of lateral beams.

2. The battery pack support structure according to claim 1, further comprising:
a reinforcement plate that extends in a longitudinal direction crossing ends of the plurality of lateral beams, wherein
a portion of the reinforcement plate, corresponding to the connection bracket, functions as the linear bracing member.

3. The battery pack support structure according to claim 1, wherein the connection bracket includes a floor joined part that is joined to the floor, the connection part connects the lateral beam joined part and the floor joined part, and
one end of the linear bracing member is joined to the part of the one of the plurality of lateral beams and an opposite end of the linear bracing member is joined to an end of the connection part of the connection bracket on a side of the floor joined part.

4. The battery pack support structure according to claim 1, wherein each of the plurality of lateral beams has a ridge which extends along a longitudinal direction of the plurality of lateral beams,
wherein the linear bracing member has a ridge which extends in a direction connecting the connection bracket and the plurality of lateral beams and the linear bracing member is placed in alignment with a position of the ridge of the plurality of lateral beams.

5. The battery pack support structure according to claim 1, wherein the connection bracket includes a first portion that is joined to the end of at least the part of the one of the plurality of lateral beams, a second portion that extends generally parallel to the floor, and a third portion that connects the first portion and the third portion, the crank shape of the connection bracket is formed by the first portion, the second portion, and the third portion.

6. A battery pack support structure, comprising:
a battery frame that is placed along a lower surface or an upper surface of a battery pack mounted below a floor of a vehicle, that is joined to the battery pack, and that has a plurality of lateral beams extending in a lateral direction, each of the plurality of lateral beams has a ridge which extends along a longitudinal direction of the plurality of lateral beams;
a connection bracket that is joined to an end of at least a part of the one of the plurality of lateral beams, that forms a crank shape in the lateral direction along with the one of the plurality of lateral beams, and that connects the battery frame and the floor; and
a linear bracing member that is placed at a corner portion of the crank shape, the linear bracing member has a ridge which extends in a direction connecting the connection bracket and the one of the plurality of lateral beams and the linear bracing member is placed in alignment with a position of the ridge of the one of the plurality of lateral beams.

7. The battery pack support structure according to claim 6, further comprising:
a reinforcement plate that extends in a longitudinal direction crossing ends of the plurality of lateral beams, wherein
a portion of the reinforcement plate, corresponding to the connection bracket, functions as the linear bracing member.

8. The battery pack support structure according to claim 6, wherein the connection bracket includes a first portion that is joined to the end of at least the part of the one of the plurality of lateral beams, a second portion that extends generally parallel to the floor, and a third portion that connects the first portion and the third portion, the crank shape of the connection bracket is formed by the first portion, the second portion, and the third portion.

* * * * *